United States Patent [19]

Jende

[11] Patent Number: 4,786,226
[45] Date of Patent: Nov. 22, 1988

[54] CONNECTING ELEMENT FOR TWO MACHINERY COMPONENTS OR CONSTRUCTIONAL COMPONENTS

[76] Inventor: Siegfried Jende, Petershütter Allee 1, D-3360 Osterode, Fed. Rep. of Germany

[21] Appl. No.: 874,603

[22] Filed: Jun. 16, 1986

[30] Foreign Application Priority Data

Jun. 18, 1985 [DE] Fed. Rep. of Germany ....... 3521755

[51] Int. Cl.⁴ ......................... F16B 23/00; F16B 35/06
[52] U.S. Cl. ................................... 411/392; 411/413; 403/408.1
[58] Field of Search ............................... 411/411–413, 411/399, 386, 392, 378; 403/408.1

[56] References Cited

U.S. PATENT DOCUMENTS

| | | | |
|---|---|---|---|
| 2,168,000 | 8/1939 | Schaurte | 411/392 |
| 3,418,012 | 12/1968 | La Torre | 403/408.1 |
| 3,630,253 | 12/1971 | Sherman | 403/408.1 |
| 4,018,132 | 4/1977 | Abe | 411/413 |
| 4,040,327 | 8/1977 | Otaki | |
| 4,338,054 | 7/1982 | Dahl | 411/424 |

FOREIGN PATENT DOCUMENTS

| | | |
|---|---|---|
| 2233560 | 2/1973 | Fed. Rep. of Germany . |
| 2143784 | 3/1973 | Fed. Rep. of Germany . |
| 8325206.1 | 10/1983 | Fed. Rep. of Germany . |
| 646701 | 10/1962 | Italy ..................................... 411/386 |
| 497201 | 12/1938 | United Kingdom ................ 411/392 |

*Primary Examiner*—Neill Wilson
*Attorney, Agent, or Firm*—Thomas & Kennedy

[57] ABSTRACT

A connecting element for two machinery components or constructional components is provided with a threaded portion 4 used for fastening and an anti-fatigue portion 3 arranged axially displaced to the threaded portion 4 and consisting of several elevations 5 and grooves 6, with the minor diameter $d_{3R}$ of the grooves 6 of the anti-fatigue portion 3 being made smaller than the minor diameter $d_3$ of the threaded portion 4. The proportion is between 80 and 100%. The pitch diameter $d_{2R}$ of the anit-fatigue portion 3 consisting of the elevations 5 and the grooves 6 are larger than or the same as the pitch diameter $d_2$ of the threaded portion 4.

7 Claims, 3 Drawing Sheets

CONNECTING ELEMENT FOR TWO MACHINERY COMPONENTS OR CONSTRUCTIONAL COMPONENTS

BACKGROUND OF THE INVENTION

The invention relates to a connecting element for two machinery components or constructional components, in particular fitting anti-fatigue bolts, fitting threaded bolts or the like, having a threaded portion used for fastening and an anti-fatigue portion arranged axially displaced to the threaded portion and consisting of several elevations and grooves, with the minor diameter of the grooves of the anti-fatigue portion being made smaller than the minor diameter of the threaded portion. As a fitting anti-fatigue bolt, the connecting element can be provided with a head. As a fitting threaded bolt, a tightening screw thread is expediently provided in addition.

A connecting element of the type described above is known from German Offenlegungsschift No. 21 43 784. In this connecting element, the anti-fatigue portion is also made as a thread which is first of all made with an outside diameter which is larger than the outside diameter of the threaded portion. However, this outside diameter of the anti-fatigue shank is rough worked to the fitting dimension. This connecting element is manufactured by thread rolling, that is by cold working, with the run of the material grain not being disturbed. The minor diameter of the grooves in the anti-fatigue portion can be between 2 and 10% smaller than the minor diameter of the fastening thread of the threaded portion. This known connecting element has a large elastic extension, so that the elasticity of the anti-fatigue portion is increased compared with the threaded portion. During uninterrupted stressing, a possible fracture will in all probability occur in the fastening thread in the known bolt. This printed matter contains no references on the configuration of the pitch diameter in the anti-fatigue portion nor on the configuration of the stress cross-section in the anti-fatigue portion.

A connecting element which is subjected to axial and bending stress is known from German Offenlegungsshrift No. 22 33 560, which connecting element likewise has an anti-fatigue and a threaded portion for fastening. In this connecting element the minor diameter of the grooves of the anti-fatigue portion depends on the material properties and the requisite elastic length under the effect of the axial force. This connecting element is also manufactured by a rolling operation. The groove and elevation volumes in the anti-fatigue portion are the same. The outside diameter of the elevations corresponds to the value determined by the design size. The profiling of the rounded parts of the grooves in the anti-fatigue portion is larger than or the same as the rounded parts of the fastening thread in the threaded portion. Here, too, no details are given on the dimensioning of the pitch diameter of the anti-fatigue portion of elevations and grooves.

From German Utility Model No. 83 25 206.1, a connecting element is known in which the minor diameter of the grooves of the anti-fatigue portion corresponds to the minor diameter of the fastening thread in the threaded portion. The two minor diameters are therefore the same, so that the resilience in the area of the anti-fatigue portion cannot be greater than the resilience in the threaded portion. The outside diameter of the elevations in the anti-fatigue portion can be larger than the outside diameter of the fastening thread of the threaded portion. An improvement in the properties by such a configuration can therefore only be expected to a very limited extent.

SUMMARY OF THE INVENTION

The object of the invention is to further develop a connecting element of the type described at the outset in such a way that, with a good elastic extension behavior and therefore a good dynamic fatigue durability, a higher reliable loading capacity is achieved under tensile stress.

This is achieved according to the invention in that the minor diameter of the grooves of the anti-fatigue portion is between 80% and less than 1 of the minor diameter of the threaded portion, and in that the pitch diameter of the anti-fatigue portion consisting of the elevations and grooves is made larger than or the same as the pitch diameter of the threaded portion. The invention is based on the concept of making the elastic resilience of the anti-fatigue portion greater than the elastic resilience of the threaded portion, namely in order to increase the fatigue strength of the entire connecting element and on the other hand to select an adequately large pitch diameter of the anti-fatigue portion compared with the pitch diameter of the threaded portion, so that it becomes possible to increase the static loading capacity. In the area of the anti-fatigue portion, the cross-section made available by the connecting element for absorbing the acting forces must be the same as or larger than in the area of the threaded portion. The pitch diameter of the anti-fatigue portion is established according to the minor diameter of the anti-fatigue portion, the pitch or lead of the elevations and the thread angle according to the formula:

$$d_{2R} = d_{3R} + \frac{2}{3} \cdot \frac{P^*}{2 \tan \frac{\alpha}{2}}$$

The minor diameter of the grooves of the anti-fatigue portion is established according to the formula:

$$d_{3R} = 0,8 \ldots 0,999 \cdot d_3$$

The bolt resilience $\theta SR$ in the area of the grooves is determined from the minor diameter of the grooves according to the formula:

$$\theta_{SR} = \frac{4}{\pi} \cdot \frac{L}{E \cdot d_{3R}^2},$$

with the modulus of elasticity E of the material and the length L of the anti-fatigue portion being entered in addition to the minor diameter $D_{3R}$.

Once the elastic resilience of the anti-fatigue portion is determined, the tensile force in the anti-fatigue portion is determined over the cross-section of the groove, in which case the equation applies:

$$F_{0,2 \; min} = R_{p0,2 \; min} \cdot A_{SR}$$

In this equation, $F_{0.2 \; min}$ is the bolt force at the minimum elastic limit, $R_{p0.2 \; min}$ is the minimum value of the creep limit according to DIN ISO 898, part 1, and $A_{SR}$ is the stress cross-section in the anti-fatigue portion. This stress cross-section $A_{SR}$ of the anti-fatigue portion and the stress cross-section $A_S$ of the threaded portion are theoretically determined according to the following formulae:

$$A_{SR} = 0{,}785 \cdot \left( \frac{d_{2R} + d_{3R}}{2} \right)^2$$

$$A_S = 0{,}785 \cdot \left( \frac{d_2 + d_3}{2} \right)^2.$$

Whereas the pitch diameter $d_2$ and the minor diameter $d_3$ in the threaded portion can be read off from appropriate dimensional tables, the pitch diameter $d_{2R}$ is calculated according to the formula stated in claim 2. It can be seen that, in the case of a specified or selected minor diameter $d_{3R}$ of the anti-fatigue portion, the pitch diameter of the anti-fatigue portion $d_{2R}$ is greatly dependent on the thread angle $\alpha$ and the pitch $P^*$. The uninterrupted capacity of the component to withstand stresses can be determined from the change in the pitch diameter and the pitch in the anti-fatigue portion. When the minor diameter of the anti-fatigue portion is smaller than in the threaded portion, it is even possible nevertheless to obtain a higher uninterrupted capacity to withstand stresses in the anti-fatigue portion than in the threaded portion, namely at least the same or greater bolt resilience $\theta S$.

The outside diameter of the elevations of the anti-fatigue portion can be larger than the outside diameter of the threaded portion, in particular in a range between 1.0 to 1.2 times the outside diameter d of the threaded portion. This range can be given by the two following formulae:

$$d_{Rmin} \geq d_{2R}$$

$$d_{Rmax} \leq 1{,}2 \cdot d.$$

It is thus no longer left to chance whether a connecting element, apart from a good uninterrupted capacity to withstand stresses, also has a higher elastic resilience and therefore a higher fatigue strength. Since although stress concentrations do not affect the uninterrupted durability of tough materials unfavorably, but in every case reduce the dynamic strength of the component, the connecting element, above all on account of a good fatigue durability, must be designed above all in such a way that necessary cross-section transitions are not made too abrupt. For the configuration of the rounded part of the grooves of the anti-fatigue portion, this means selecting this rounded part to be the same as or larger than the rounded part of the threaded portion. The same applies to the groove run-in and groove run-out. The rounded part $R_{RI}$ at the groove root should be in the range of:

$$R_{RI} \approx \frac{P^*}{6{,}9}$$

In outside diameter, the elevations can be provided with a straight crest or also with a radius of curvature $R_{RA}$. The flanks of the grooves and those of the adjacent elevations should adjoin the respective rounded parts in a common tangent. To achieve an optimum tensile strength, the shank diameter of the connecting element in the pressed area $L_K$ must on no account become smaller than the rolled diameter $d_f$ of the corresponding thread. Only the minor diameter of the groove of the anti-fatigue portion and the minor diameter of the thread itself fall below this rolled diameter. The theoretically determined pitch diameters of the threaded portion and the anti-fatigue portion as a rule also lie slightly below the corresponding rolled diameter. All other transitions and also the radius beneath the head in the case of a fitting anti-fatigue bolt are to be provided with the radii and transitions which are customary in bolt production today. Thus, for example, the transition between the shank and the head should not have a stress concentration factor $\alpha_k$ greater than 5.

The elevations of the anti-fatigue portion can be rough worked to the fitting dimension by grinding or mounting, with of course it not being permissible for the dimension to fall below the pitch diameter of the anti-fatigue portion. The anti-fatigue portion can consist of a plurality of circling elevations and grooves or of a single-start or multiple-start fitting thread. The elevations and grooves or the fitting thread of the anti-fatigue portion and also the thread of the threaded portion can be attached onto the rolled diameter $d_f$ or $d_{fR}$ before or after heat treatment.

The rounded part of the grooves of the anti-fatigue portion can have a radius or a logarithmic profile and run out into a straight line at the root, the length of which straight line does not exceed $0.017 \times$ minor diameter of the anti-fatigue portion.

BRIEF DESCRIPTION OF THE DRAWINGS

The invention is described in greater detail with reference to a preferred exemplary embodiment. In the drawing.

DETAILED DESCRIPTION

Figure 1:
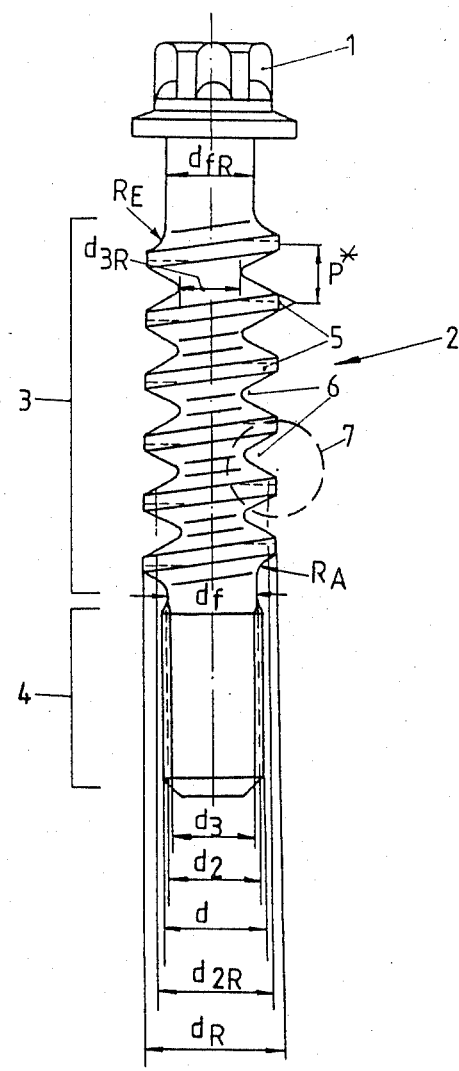
FIG. 1 shows a view of the connecting element in the form of a fitting anti-fatigue bolt.

The fitting anti-fatigue bolt shown in FIG. 1 has a head 1 and a shank 2. The shank 2 has an anti-fatigue portion 3 and a threaded portion 4. The threaded portion 4 is arranged as a rule on the end of the shank 2 which is remote from the head 1, whereas the anti-fatigue portion 3 is provided between the head and the threaded portion 4. The anti-fatigue portion 3 need not necessarily extend over the entire remaining length of the shank 2.

The anti-fatigue portion 3 has elevations 5 and grooves 6. Here, the elevations 5 are made as the peaks of a single-start thread, whereas the grooves 6 represent the corresponding recesses. A multi-start thread design or even circling elevations and grooves can of course also be provided. The anti-fatigue portion 3 is formed by at least two elevations and a groove. Because of the arrangement of the grooves 6, a minor diameter $d_{3R}$ is obtained in the anti-fatigue portion 3. The outside diameter $d_R$ is formed by the elevations 5. The pitch diameter $d_{2R}$ in the anti-fatigue portion is obtained according to the formula stated. The threaded portion 4 is dimensioned in normal manner, that is, with the minor diameter $d_3$, the pitch diameter $d_2$ and the outside diameter d. The shank 2 is shaped by thread rolling. The rolled diameter of the blank is designated as $d_f$ for the threaded portion 4 and as $d_{fR}$ for the anti-fatigue portion 3, with it being possible for the initial diameters of the blank to be the same. It can be seen that the pitch diameter $d_2$ of the threaded portion 4 is smaller than the pitch diameter $d_{2R}$ of the anti-fatigue portion 3. Different rolled diameters of the portions 3 and 4 can also be provided ($d_f \neq d_{fR}$). The anti-fatigue portion has the pitch P*. The radii $R_A$ and $R_E$ at the start and end of the elevation 5 are selected with the shape which is most favorable for the respective dynamic stresses.

Figures 2, 3:
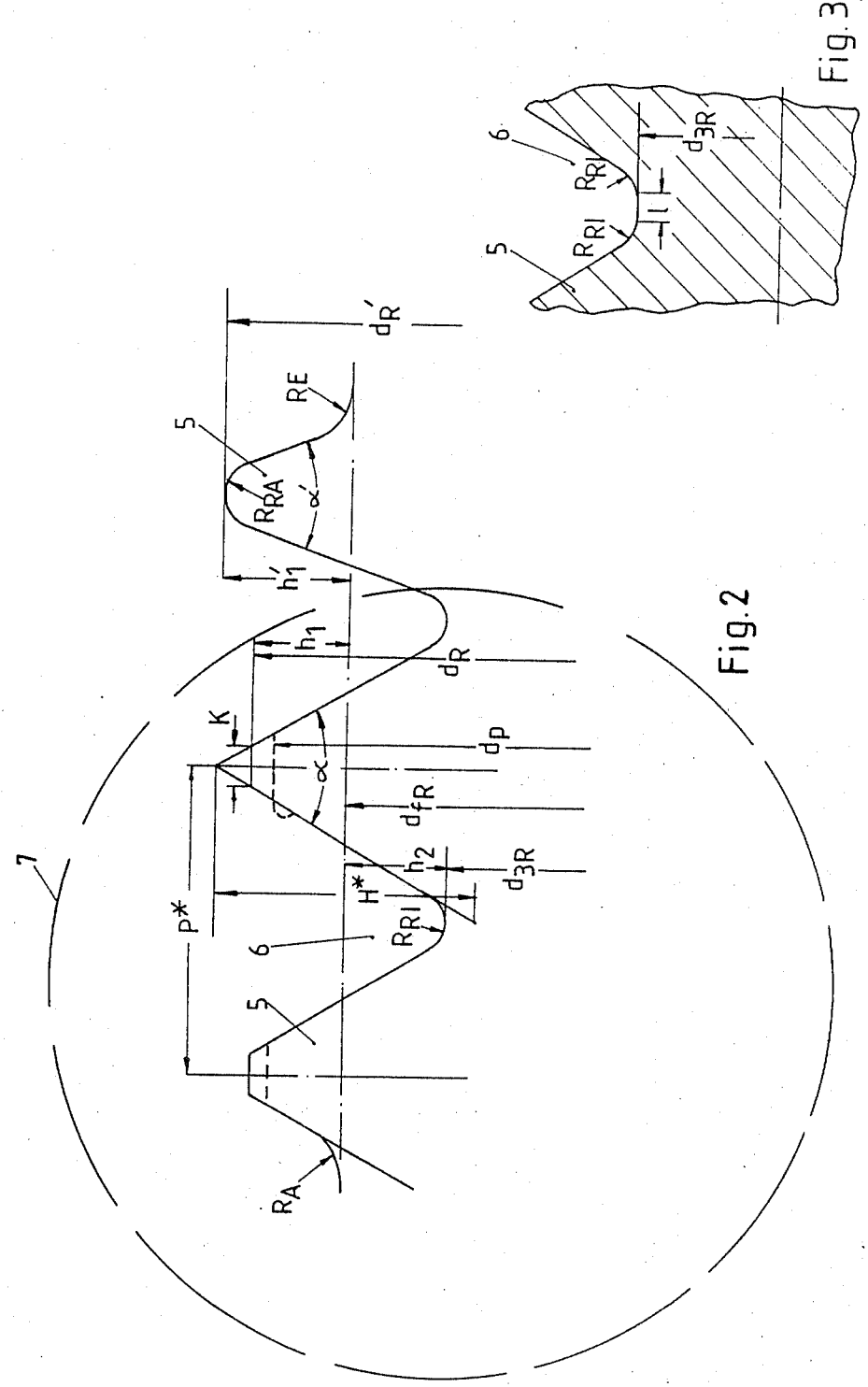
FIG. 2 shows a detailed representation from the anti-fatigue portion.
FIG. 3 shows an embodiment possibility for the rounded part of the groove in the anti-fatigue portion.

FIG. 2 shows a detail 7 as circled in FIG. 1. Two elevations 5 are shown which are rough worked to the fitting diameter $d_p$ by grinding or mounting. The profile is defined relative to the rolled diameter $d_f$ by the heights $h_1$ and $h_2$. It is also possible, as shown on the further elevation 5, for the rolled profile also to have a radius $R_{RA}$ on the outside on the elevation 5. Starting from the same roll diameter $d_f$, a larger groove outside diameter $d_R'$ is obtained by another thread angle $\alpha'$. This diameter can also act as a fitting diameter. In the flattened profile, the crest width K results automatically from the pitch P* and the thread angle $\alpha$ and also from the height $h_1$ which as a rule amounts to ⅜ of the total height H. By working down to the diameter $d_p$, the crest width K increases in accordance with the intercept theorem.

The root of the grooves in the anti-fatigue portion 3 can be of various embodiment. FIG. 2 shows a radius $R_{RI}$ which merges tangentially into the flank of the thread angle $\alpha$. Instead of the radius, a logarithmic profile can also be provided. However, it is also possible, as shown in FIG. 3, to provide a straight piece between two radii $R_{RI}$, which therefore runs parallel to the axis of the connecting element. This groove root may run between the two radii over a maximum length of $l = 0.017 \times d_{3R}$.

Figure 4:
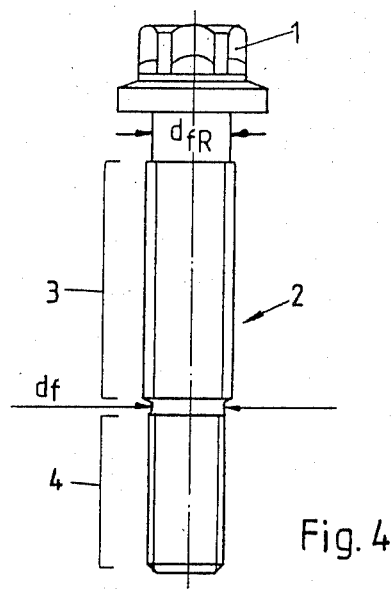
FIG. 4 shows a practical exemplary embodiment of a connecting-rod bolt.
Figure 5:
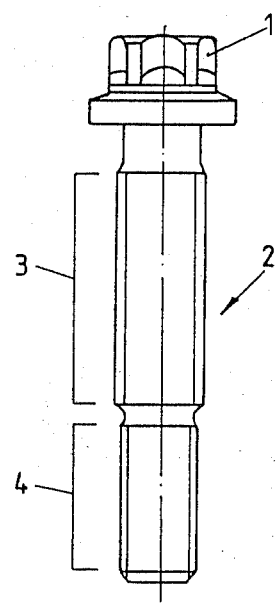
FIG. 5 shows a further practical exemplary embodiment of a connecting-rod bolt.

Two practical exemplary embodiments are shown in FIGS. 4 and 5:

Example I

Connecting element connecting-rod bolt according to FIG. 4
Anti-fatigue portion rolled alternatively before or after heat treatment
Threaded portions (in this case because connecting-rod bolt) M 7–4 g rolled after head treatment
Dimensional comparison of the two geometric forms:

|  | Threaded portion with thread M7-4 g (max) | | Anti-fatigue portion with fitting thread | |
|---|---|---|---|---|
| Outside or nominal diameter mm | d | 6.75–6.9 | $d_R$ | 7.7–0.2 (before grinding) |
| Fitting diameter mm | $d_p$ | | $d_p$ | 7.4–0.1 (after grinding) |
| Lead mm | P | 1 | P* | 1.75 |
| Pitch dia. mm | $d_2$ | 6.32 | $d_{2R}$ | 6.65 |
| Minor dia. mm | $d_3$ | 5.75 | $d_{3R}$ | 5.6–0.1 |
| Rolled diameter mm | $d_f$ | 6.27 | $d_{fR}$ | 6.60–6.65 |
| Rounded part mm | R | 0.144 | $R_{RI}$ | 0.32–0.1 |
| Profile depth mm | H | 0.866 | H* | 1.52 |
| Pressed width mm | K | | K | 0.2 + 0.15 |
| Stress cross-section mm² | $A_S$ | 28.9 | $A_{SR}$ | 29.21 |
| Thread angle ° | $\alpha$ | 60 | $\alpha$ | 60 ± 2 |

Tolerance specifications have been dispensed with for the thread; only nominal dimensions have been specified. The tolerances are to be taken from DIN 13. For the anti-fatigue portion the most important tolerances have been specified.

Example II

Connecting element connecting-rod bolt according to FIG. 5
Anti-fatigue portion rolled alternatively before or after heat treatment
Threaded portion (in this case because connecting-rod bolt) M8×1–4 g rolled after heat treatment.
Dimensional comparison of the two geometric forms:

|  | Threaded portion with thread M8-4 g (max) | | Anti-fatigue portion with fitting thread | |
|---|---|---|---|---|
| Outside or nominal diameter mm | d | 7.75–7.9 | $d_R$ | 8.8–0.2 |
| Fitting diameter mm | $d_p$ | | $d_p$ | 8.5–0.02 |
| Lead mm | P | 1 | P* | 1.75–2 Gg (double start) |
| Pitch diameter mm | $d_2$ | 7.32 | $d_{2R}$ | 7.65 |
| Minor diameter mm | $d_3$ | 6.75 | $d_{3R}$ | 6.6–0.1 |
| Rolled diameter mm | $d_f$ | 7.30 | $d_{fR}$ | 7.58–7.64 |
| Rounded part mm | R | 0.18 | $R_{RI}$ | 0.3–0.1 |
| Profile depth mm | H | 0.866 | H* | 1.52 |
| Pressed width mm | K | | K | 0.3 ± 0.1 (after grinding) |
| Stress cross-section mm² | $A_S$ | 39.2 | $A_{SR}$ | 39.57 |
| Thread angle ° | | 60 | | 60 ± 2 |

Tolerance specifications have been dispensed with for the thread; only nominal dimensions have been specified. The tolerances are to be taken from DIN 13. For the anti-fatigue portion the most important tolerances have been specified.

LIST OF REFERENCE NUMERALS

1 = Head
2 = Shank
3 = Anti-fatigue portion
4 = Threaded portion
5 = Elevation
6 = Groove
7 = Detail

I claim:
1. An anti-fatigue connecting element comprising a head and a solid elongated shank extending from said head said shank including a threaded portion used for fastening elements together and an anti-fatigue portion positioned between said head and said threaded portion and axially displaced along said shank from the threaded portion, said anti-fatigue portion including several elevations and grooves, with the minor diameter of the grooves of the anti-fatigue portion being made smaller than the minor diameter of the threaded portion, wherein the minor diameter ($^d3R$) of the grooves (6) of the anti-fatigue portion (3) is between 80% and less than 100% of the minor diameter ($^d3$) of the threaded portion (4), and wherein the pitch diameter ($^d2R$) of the anti-fatigue portion (3), the pitch (P*) and the thread angle ($\alpha$) substantially satisfy the equation:

$$(^d2R) = (^d3R) + \tfrac{3}{8} \cdot P^*/(2 \tan (\alpha/2))$$

where P* = the pitch of the threads of the anti-fatigue portion and $\alpha$ is the thread angle.

2. The connecting element as claimed in claim 1 wherein the outside diameter $d_R$ of the elevations (5) of the anti-fatigue portion (3) is made larger than the outside diameter d of the threaded portion (4), in particular in a range between 1.0 to 1.2 times the outside diameter d of the threaded portion (4).

3. The connecting element as claimed in claim 2, wherein the elevations (5) of the anti-fatigue portion (3) are characterized by having been rough worked to the fitting dimension by grinding, turning or mounting.

4. A connecting element as claimed in claim 1 wherein the anti-fatigue portion (3) consists of a plurality of circling elevations (5) and grooves (6) or a single-start or multiple-start fitting thread (5, 6).

5. An anti-fatigue connecting element for fastening together machinery components and the like, comprising a rectilinear shank (2) and a head member (1) mounted to one end of said shank, said shank including a helically threaded fastening portion (4) and an anti-fatigue portion (3) axially displaced from said fastening portion, said fastening portion including helical threads having a minor diameter ($^d3$), a pitch diameter ($^d2$), an outside diameter (d), and rounded recesses between adjacent ones of its threads, said anti-fatigue portion (3) of the shank including alternating elevations (5) and grooves (6) extending circumferentially about the shank with said grooves being rounded between adjacent elevations at a radius of curvature of at least as large as the radius of curvature of the rounded recesses between adjacent threads of said fastening portion, with the grooves of said anti-fatigue portion having a minor diameter ($^d3R$) and the elevations having an outside diameter ($^dR$) and a pitch diameter ($^d2R$), said minor diameter ($^d3R$) of said grooves (6) of the anti-fatigue portion being between 80% and 100% of the minor diameter ($^d3$) of the helical threads of the fastening portion (4), and wherein the pitch diameter ($^d2R$) of the anti-fatigue portion (3) is at least as large as the pitch diameter ($^d2$) of the helical portion (4) and wherein the pitch diameter ($^d2R$) of the anti-fatigue portion (3), the pitch (P*) and the thread angle ($\alpha$) substantially satisfy the equation:

$$(^d2R) = (^d3R) + \tfrac{3}{8} \cdot P^*/(2 \tan (\alpha/2))$$

where P* = the pitch of the threads of the anti-fatigue portion and $\alpha$ is the thread angle.

6. A connecting element as claimed in claim 5, wherein the rounded part of the groove (6) of the anti-fatigue portion (3) has a radius ($^RRI$) or a Logarithmic profile and runs out at the root into a straight line, the length of which does not exceed 0.017 × minor diameter ($^d3R$) of the anti-fatigue portion (3).

7. An anti-fatigue connecting element for fastening together machinery components and the like, comprising a solid rectilinear shank (2) and a head member (1) mounted to one end of said shank, and shank including a helically threaded fastening portion (4) and an anti-fatigue portion (3) axially displaced from said fastening portion said fastening portion including helical threads having a minor diameter ($^d3$), a pitch diameter ($^d2$) and an outside diameter (d), said anti-fatigue portion (3) of the shank including alternating elevations (5) and grooves (6) extending circumferentially about the shank with the grooves having a minor diameter ($^d3R$), and the elevations (5) and grooves (6) extending circumferentially about the shank with the grooves having a minor diameter ($^d3R$), and the elevations having an outside diameter ($^dR$) and a pitch diameter ($^d2R$), said minor diameter ($^d3R$) of said grooves (6) of the anti-fatigue portion being between 80% and less than 100% of the minor diameter ($^d3$) of the helical threads of the fastening portion (4), and wherein the pitch diameter ($^d2R$) of the anti-fatigue portion (3) is at least as large as the pitch diameter (2) of the helical threads of the fastening portin (4) and wherein the pitch diameter ($^d2R$) of the anti-fatigue portion (3), the pitch (P*) and the thread angle ($\alpha$) substantially satisfy the equation:

$$(^d2R) = (^d3R) + \tfrac{3}{8} \cdot P^*/(2 \tan (\alpha/2))$$

where P* = the pitch of the threads of the anti-fatigue portion and $\alpha$ is the thread angle.

* * * * *